(12) United States Patent
    Sarkar et al.

(10) Patent No.: US 10,831,818 B2
(45) Date of Patent: Nov. 10, 2020

(54) DIGITAL IMAGE SEARCH TRAINING USING AGGREGATED DIGITAL IMAGES

(71) Applicant: Adobe Inc., San Jose, CA (US)

(72) Inventors: Mausoom Sarkar, New Delhi (IN); Hiresh Gupta, Shimla (IN); Abhishek Sinha, Noida (IN)

(73) Assignee: Adobe Inc., San Jose, CA (US)

( * ) Notice: Subject to any disclaimer, the term of this patent is extended or adjusted under 35 U.S.C. 154(b) by 83 days.

(21) Appl. No.: 16/177,243

(22) Filed: Oct. 31, 2018

(65) Prior Publication Data

US 2020/0134056 A1    Apr. 30, 2020

(51) Int. Cl.
| | |
|---|---|
| *G06K 9/54* | (2006.01) |
| *G06F 16/58* | (2019.01) |
| *G06N 3/08* | (2006.01) |
| *G06F 16/56* | (2019.01) |
| *G06F 16/583* | (2019.01) |

(52) U.S. Cl.
CPC ............. *G06F 16/58* (2019.01); *G06F 16/56* (2019.01); *G06F 16/583* (2019.01); *G06N 3/08* (2013.01)

(58) Field of Classification Search
CPC ......... G06N 3/08; G06F 16/03; G06F 16/583; G06F 16/56
USPC .......................................................... 382/305
See application file for complete search history.

(56) References Cited

U.S. PATENT DOCUMENTS

| | | | | |
|---|---|---|---|---|
| 2015/0142708 | A1* | 5/2015 | Jing | G06F 40/169 |
| | | | | 706/12 |
| 2017/0103267 | A1* | 4/2017 | Mishra | G06K 9/6254 |
| 2017/0364733 | A1* | 12/2017 | Estrada | G06N 3/08 |
| 2019/0392351 | A1* | 12/2019 | Zuluaga | G06F 17/18 |

OTHER PUBLICATIONS

Taigman, "DeepFace: Closing the Gap to Human-Level Performance in Face Verification", Jun. 2014, 8 pages.

* cited by examiner

*Primary Examiner* — Gabriel I Garcia
(74) *Attorney, Agent, or Firm* — SBMC

(57) ABSTRACT

Digital image search training techniques and machine-learning architectures are described. In one example, a query digital image is received by service provider system, which is then used to select at least one positive sample digital image, e.g., having a same product ID. A plurality of negative sample digital images is also selected by the service provider system based on the query digital image, e.g., having different product IDs. The at least one positive sample digital image and the plurality of negative samples are then aggregated by the service provider system into a single aggregated digital image. At least one neural network is then trained by the service provider system using a loss function based on a feature comparison between the query digital image and samples from the aggregated digital image in a single pass.

20 Claims, 12 Drawing Sheets

DIGITAL IMAGE SEARCH TRAINING USING AGGREGATED DIGITAL IMAGES

BACKGROUND

Digital image search may be used by service provider systems to support a wide range of functionality. Digital image search, for instance, may be used to locate products included in digital images, locate digital images for use in content creation (e.g., to create webpages, digital marketing content, digital videos, and digital media), and so forth. Thus, digital image search may be implemented by service provider systems to search through thousands and even millions of digital images to locate a digital image of interest, which is not possible for a human to do, alone, without such assistance.

Conventional techniques that are used to support digital image search, however, may be inaccurate and prone to error, especially within image domains that exhibit large amounts of variance. One such example involves a fashion domain in which digital image search is implemented by a service provider system to locate apparel (e.g., clothing and accessories) depicted in the digital images. Conventional image search systems, for instance, may rely on data regarding landmarks and clothing types, which are referred to collectively as "attributes." To obtain this data, conventional image search techniques rely on user inputs to manually select such attributes for apparel depicted in each digital image of the fashion domain.

Fashion domains, however, may include millions of fashion-related data images, thereby making manual selection of the attributes prohibitive and rely on a user's accuracy in selecting the attributes. Thus, these conventional techniques may be prone to error when tasked with attribute selection for thousands of digital images. For clothing classification and recognition techniques in the fashion domain, for instance, apparel may vary in style, texture, form or fit (e.g., how clothing is cut), material, and so on which may confuse and misdirect conventional fashion domain search techniques. Also, clothing items, such as those made from soft fabrics, are subject to deformation and occlusion (e.g., the closing of openings in clothing), further complicating efforts made by conventional techniques to correctly recognize individual clothing items. Further, clothing images may demonstrate substantial variations when taken under different conditions, such as that observed between self-portraits (e.g., "selfies") as compared to professional online shopping photos taken by a professional photographer in a studio with controlled lighting. As a result, conventional digital image search techniques face challenges when adopted in the real-world, especially for particular domains having digital images that may vary within the domain in numerous ways as observed for the fashion domain above.

To take into account the above-discussed variability, conventional techniques rely on annotations with semantic attributes, such as color, category, and texture. However, doing so may result in the creation of different datasets having different or inconsistent annotations, as these annotations may vary depending on a user that manually provided the annotations. Accordingly, conventional digital image search techniques, especially when employed in image domains having a high degree of variance like fashion domains, are both inefficient with respect to user interaction as well as result in inefficient use of computational resources of computing devices that implement these conventional techniques for service provider systems.

SUMMARY

Digital image search training techniques and machine-learning architectures are described herein that overcome the challenges of conventional techniques to perform image search, especially for image domains that exhibit high degrees of variance such as fashion domains. To overcome these challenges, training techniques are used to train neural networks to perform a search by leveraging an aggregated digital image as part of a two-stream machine learning architecture with increased accuracy and computational efficiency over conventional techniques.

In one example, a query digital image is received by a training data generation module of a service provider system. The training data generation module uses the query digital image to select at least one positive sample digital image using an image selection module. A positive sample digital image is a digital image that is visually similar to the query digital image. In one example, the positive sample digital image is selected that has a product identifier (ID) that matches a product identifier associated with the query digital image. A query digital image of an article of clothing having an associated product ID, for instance, may be used as a basis to select the positive sample digital image from a database that also is associated with the same product ID.

A plurality of negative sample digital images is also selected by the image selection module of the training data generation module based on the query digital image. A negative sample digital image is a digital image that is not visually similar to the query digital image. In one example, the positive sample digital image is selected by the computing device as having a product identifier (ID) that does not match a product identifier associated with the query digital image. A query digital image of an article of clothing having an associated product ID, for instance, may be used as a basis to select the negative sample digital image from a database that has a different product ID, e.g., for a different article of clothing.

The at least one positive sample digital image and the plurality of negative samples are then aggregated by an image aggregation module of the training data generation module into a single aggregated digital image. This may be performed to generate multiple aggregated digital images. At least one neural network is then trained by a model training module of the service provider system using a loss function based on a feature comparison between the query digital image and samples from the respective aggregated digital image in a single pass. This may be performed for the multiple aggregated digital images, which leads to faster convergence and training in comparison with conventional "single pass" neural networks, e.g., having conventional Siamese type architectures. In this way, generation of the aggregated digital image and training of a neural network by the aggregated digital image may overcome the limitations of conventional techniques described above.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
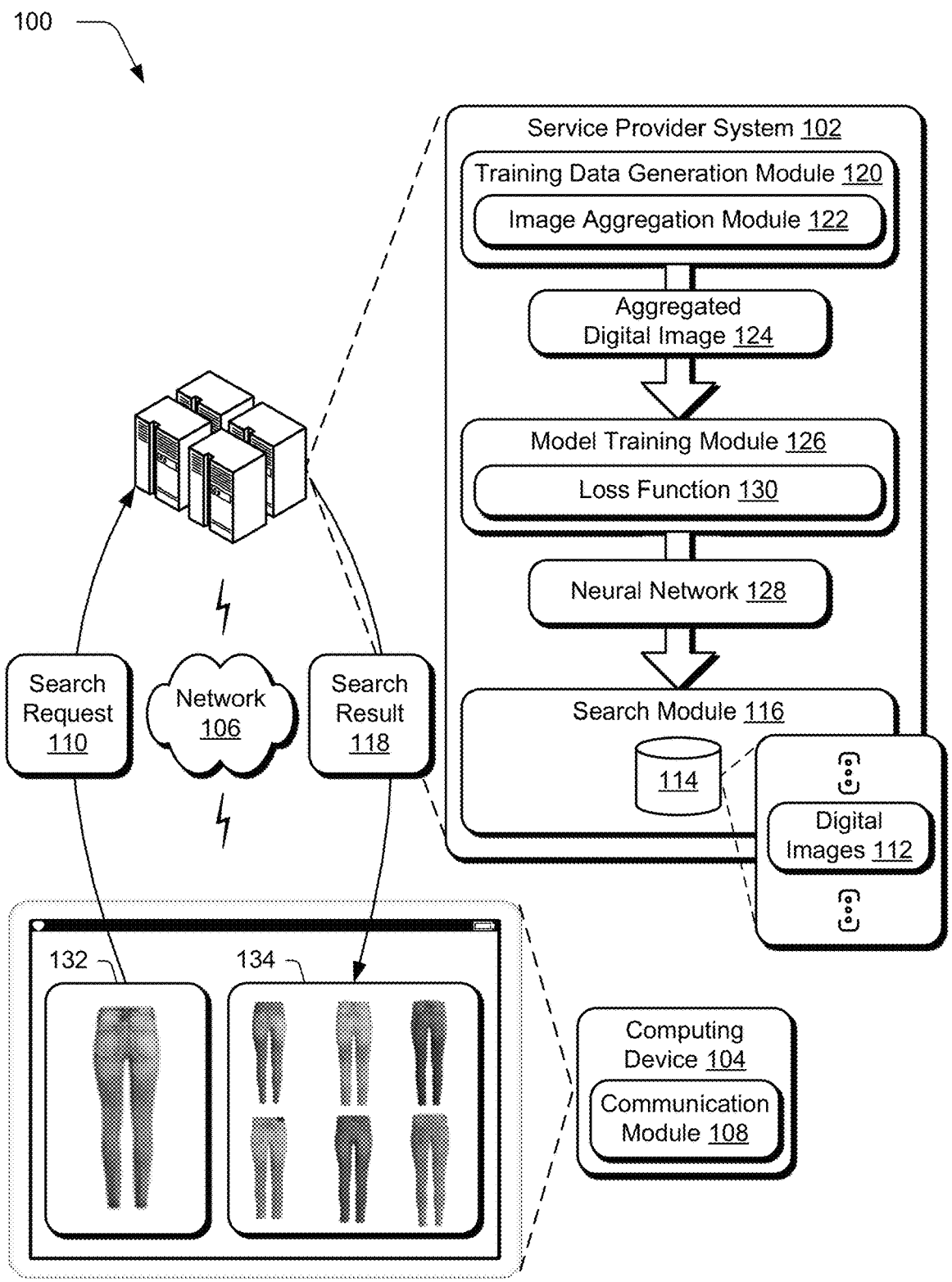
FIG. 1 is an illustration of an environment in an example implementation that is operable to employ digital image machine-learning training techniques that leverage aggregated digital images.

Conventional techniques used by service provider systems to perform digital image search are confronted with a variety of challenges. One such challenge involves digital image search for objects that may exhibit a high level of variance of an object between digital images, even though the digital images include the same object. An example of an image domain that exhibits a high degree of variance is referred to as a "fashion domain," which refers to apparel (e.g., clothing and accessories) that may be worn by users.

As previously described, apparel may vary in style, texture, form or fit (e.g., how clothing is cut), material, and so on. Also, apparel, such as those made from soft fabrics, are subject to deformation and occlusion from image to image. Further, digital images of apparel, even for the same item of apparel, may demonstrate substantial variations when taken under different conditions, such as that observed between self-portraits (e.g., "selfies") as compared to professional online shopping photos taken by a professional photographer in a studio with controlled lighting.

Conventional techniques that have been developed to address these challenges rely on the assignment of semantic attributes (e.g., color, category, texture), clothing locations (e.g., masks of clothes), or cross-domain image correspondences. As previously described, generation of these annotations is laborious and resource intensive. Even though conventional techniques have been subsequently developed to annotate a comprehensive dataset for the fashion domain (known as "DeepFashion"), search-related issues may persist due to limitations in search techniques that leverage this dataset. For instance, although search techniques have been developed based on this dataset, these conventional techniques still require iterative training. In iterative training, an image-to-image comparison is made using a respective pass. Thus, a multitude of passes are required to process each image from the multitude of images in this comprehensive dataset, which is resource and time intensive. An example of a conventional iterative comparison technique is referred to as a Siamese-type machine-learning architecture.

Additionally, as part of performing this iterative comparison, to train against multiple negative instances using Siamese-type machine-learning architecture, separate copies for each negative instance are created, which further increases consumption of computational resources such as memory to maintain these separate copies. Further, these conventional techniques also require explicit attribute training to learn discriminative representations, especially for apparel recognition when supervised by user-defined attributes. These attributes are defined manually as previously described, with users required to first select attributes for each digital image to be used for training. This involves a significant amount of manual user interaction and consumption of computational resources as well as relies on the accuracy of the user in annotating the digital images. These challenges limit the accuracy of a search result generated in response to an input digital image, as well as the overall operational efficiency of computing devices that implement such architectures.

Accordingly, digital image search training techniques and machine-learning architectures are described herein that overcome the challenges of conventional techniques to perform image search, especially for image domains that exhibit high degrees of variance such as fashion domains. To overcome these challenges, training techniques are used to train neural networks to perform a search by leveraging an aggregated digital image as part of a two-stream machine learning architecture with increased accuracy and computational efficiency over conventional techniques. In the techniques described herein, a service provider system first generates the aggregated digital image, and thus uses this image to train at least one neural network.

In order generate the aggregated digital image, automatically and without user intervention, the service provider system employs a training data generation module. The training data generation module first receives a query digital image that is representative of a type of product, for which, the neural network is to be trained, such as to recognize a particular item of clothing. The query digital image is then used by an image selection module of the training data generation module to select at least one positive sample digital image and a plurality of negative sample digital images. The positive sample digital image is selected as visually similar to the query digital image, e.g., has a same product ID. The negative sample digital images are selected as visually dissimilar to the query digital image, e.g., has a different product ID. An image aggregation module of the training data generation module then generates the aggregated digital image from these samples, e.g., arranged as a grid. This process may be repeated by the training data generation module to generate multiple aggregated digital images.

The aggregated digital images, and corresponding query digital images, are then provided by the training data generation module to a model training module to train a neural network using a loss function. Through use of the aggregated digital image, the neural network of the model training module views multiple negative instances in a single pass as part of training. This is contrasted with the multitude of passes required by a single negative sample per image mismatch comparison as performed in conventional Siamese-type machine learning architectures. This leads to faster convergence and accuracy in the training of the neural networks over conventional approaches, thereby improving computational efficiency. The neural network, once trained, may then be leveraged in a variety of ways, such as to search a database of digital images based on an input digital image by a search module. Further discussion of these and other examples is included in the following sections and shown in corresponding figures.

Terms

A "query digital image" is a digital image that serves as a basis to train a neural network or other machine-learning architecture as part of machine learning by a computing device.

A "positive sample digital image" is a digital image selected by a computing device based on the query digital image as being visually similar to the query digital image. In one example, the positive sample digital image is selected that has a product identifier (ID) that matches a product identifier associated with the query digital image. A query digital image of an article of clothing having an associated product ID, for instance, may be used as a basis to select the positive sample digital image from a database that also is associated with the same product ID.

A "negative sample digital image" is a digital image selected by a computing device based on the query digital image as not being visually similar to the query digital image. In one example, the positive sample digital image is selected by the computing device as having a product identifier (ID) that does not match a product identifier associated with the query digital image. A query digital image of an article of clothing having an associated product ID, for instance, may be used as a basis to select the negative sample digital image from a database that has a different product ID.

An "aggregated digital image" is a single digital image that is generated by a computing device using the positive sample digital image and the negative sample digital image. In one example, this permits training of a machine-learning model in conjunction with the query digital image in a single pass. The aggregated digital image, for instance, may be formed as a grid that includes the positive sample digital image and a plurality of negative sample digital images.

A "neural network" is implemented by a computing device via nodes arranged in layers to implement a framework of machine learning algorithms.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium search environment 100 in an example implementation that is operable to employ digital image search training techniques described herein. The illustrated environment 100 includes a service provider system 102 and a computing device 104 that are communicatively coupled, one to another, via a network 106. Computing devices that implement the service provider system 102 and the computing device 104 may be implemented in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as described in FIG. 12.

The computing device 104 is illustrated as including a communication module 108 that is configured to communicate with the service provider system 102 via the network 106, e.g., as a web-enabled application, browser, and so on implemented using a processing system and computer-readable storage medium. The communication module 108 is configured to generate a search request 110 that is communicated to the service provider system 102 to initiate an image search of digital images 112 (illustrated as stored in a storage device 114) by a search module 116. The search module 116 then communicates a search result 118 generated as part of the search. As previously described, image search may support a variety of functionality, such as to search for and locate digital images of product imagery, e.g., shown as spin sets or other product views, in various example settings, including a banner or video frame. Further, the search functionality described herein may be integrated or used with fine-grained tagging capabilities by the service provider system 102 to assign tags to digital images automatically and without user intervention. For such uses, these techniques may be trained to tag images with domain specific or customer specific tags. For example, the service provider system 102 may be used to tag images of cars with specific model names and even different objects included in the digital image 112, e.g., to find a digital image of a handbag which is being held by a model in a photograph that contains a large amount of distracting background.

The service provider system 102 is configured to support a machine-learning architecture that supports an intuitive and efficient self-updating search technique that addresses the challenges faced by conventional search techniques. These techniques may be used by the service provider system 102 to solve the problems of identifying, locating and searching digital images 112, and more particularly objects depicted in these images.

To do so, the service provider system 102 employs a machine-learning architecture and training technique that supports robust feature extraction of objects (e.g., apparel) from digital images 112 that is faster than conventional techniques. The service provider system 102, for instance, includes a training data generation module 120 and image aggregation module 122 that is configured to form an aggregated digital image 124 that is to be used for training.

The training data generation module 120, for instance, may receive a query digital image that is associated with a product ID. The image aggregation module 122 may then select at least one positive sample digital image (e.g., having a matching product ID) and a plurality of negative sample digital images (e.g., having different product IDs) to generate a single aggregated digital image 124.

The aggregated digital image 124 is then provided to a model training module 126 to train a machine-learning model, illustrated as a neural network 128, using a loss function 130. In one example, the model training module 126 employs the neural network 128 to determine features (e.g., image attributes) from the query digital image and the aggregated digital image, respectively. Thus, the model training module 126 is configured to determine the image attributes independently in an unsupervised manner through machine learning without requiring prior manually supervised attribute training of conventional techniques.

A convolutional neural network is then employed by the model training module 126 as further described in relation to FIG. 7 to convolve the features to form a similarity matrix, which is then used to predict similarity values between the query digital image and the multiple samples in the aggregated digital image 124 in a single pass using the loss function 130, e.g., as a double hinge loss as further described below. In this way, the techniques and architecture described herein may reach convergence as part of training the neural network 128 faster and more efficiently than conventional techniques and may be used for image domains that exhibit high degrees of variance, like fashion domains.

The neural network 128, once trained, is then provided to the search module 116 to perform an image search. The computing device 104, for instance, may provide an input digital image 132 as a search request 110 to the service provider system 102. Features are then extracted by the search module 116 using the neural network 128 and compared to features extracted from the digital images 112 to perform the search. An amount of similarity of the digital images 112 to the input digital image 132 is then used to rank digital images, and more particularly objects in the digital image, to generate a search result 118 that includes these digital images 134. This may be used to search for and locate digital images of product imagery, e.g., shown as spin sets or other product views, in various example settings, including a banner or video frame. This may also support a variety of other functionality, such as to generate fine-grained tags automatically and without user intervention.

In this way, the machine-learning architecture and training techniques employed by the service provider system 102 may process multiple negative instances (or dissimilar images) based on a query digital image in a single pass to train the neural networks 128. This is in contrast to producing a single negative per image mismatch as done in traditional Siamese networks and thus leads to faster convergence. Since separate copies of a neural network are not created for each of the negative instances, the techniques described herein do not require a large additional memory overhead as in conventional techniques. Further discussion of these and other examples is included in the Digital Image Search Training section that follows.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures described herein may be used in any suitable combinations and are not limited to the particular combinations represented by the enumerated examples in this description.

Digital Image Search Training

Figure 2:
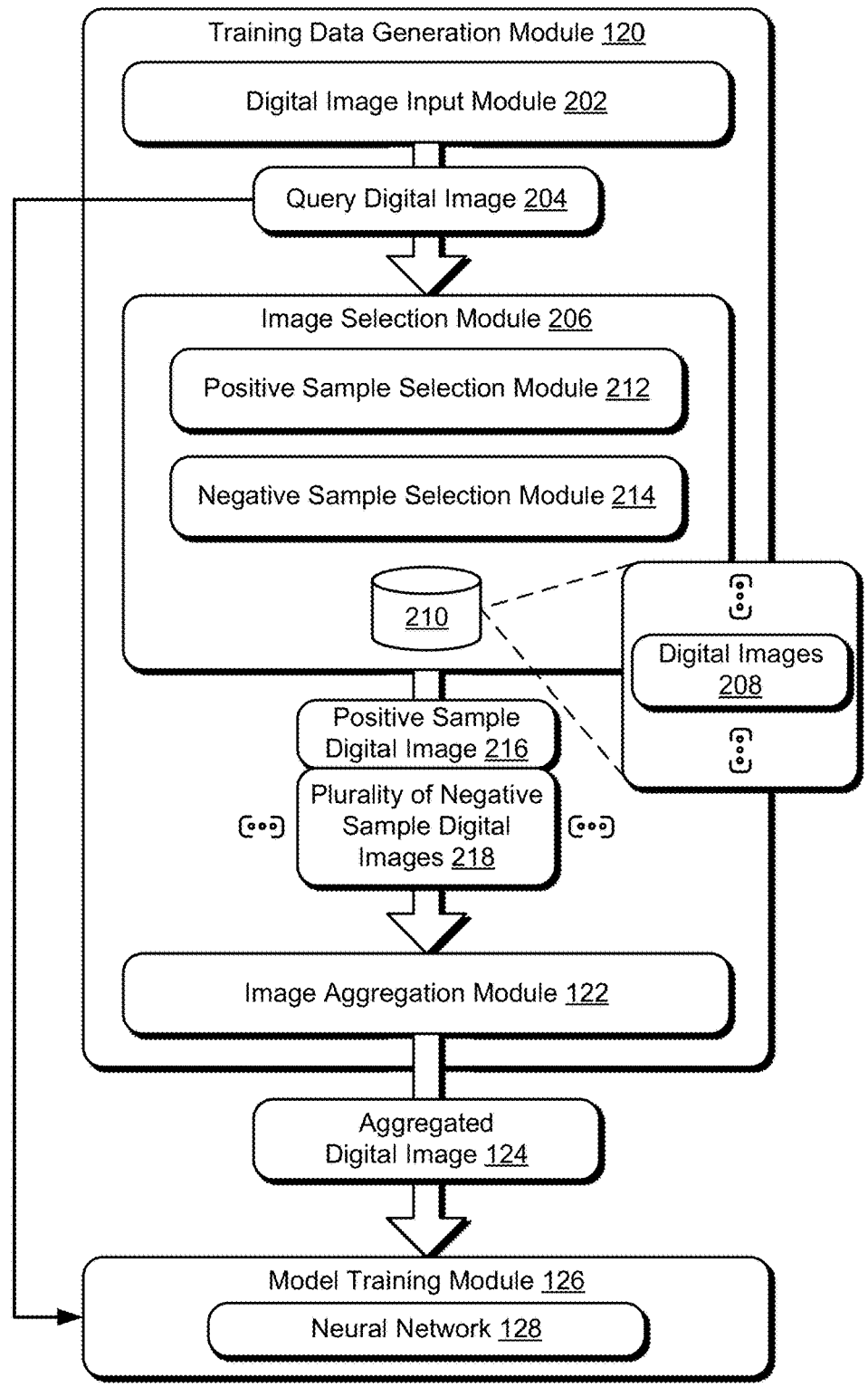
FIG. 2 depicts a system in an example implementation in which at least one neural network is trained to perform image search based at least in part on an aggregated digital image.
Figure 3:
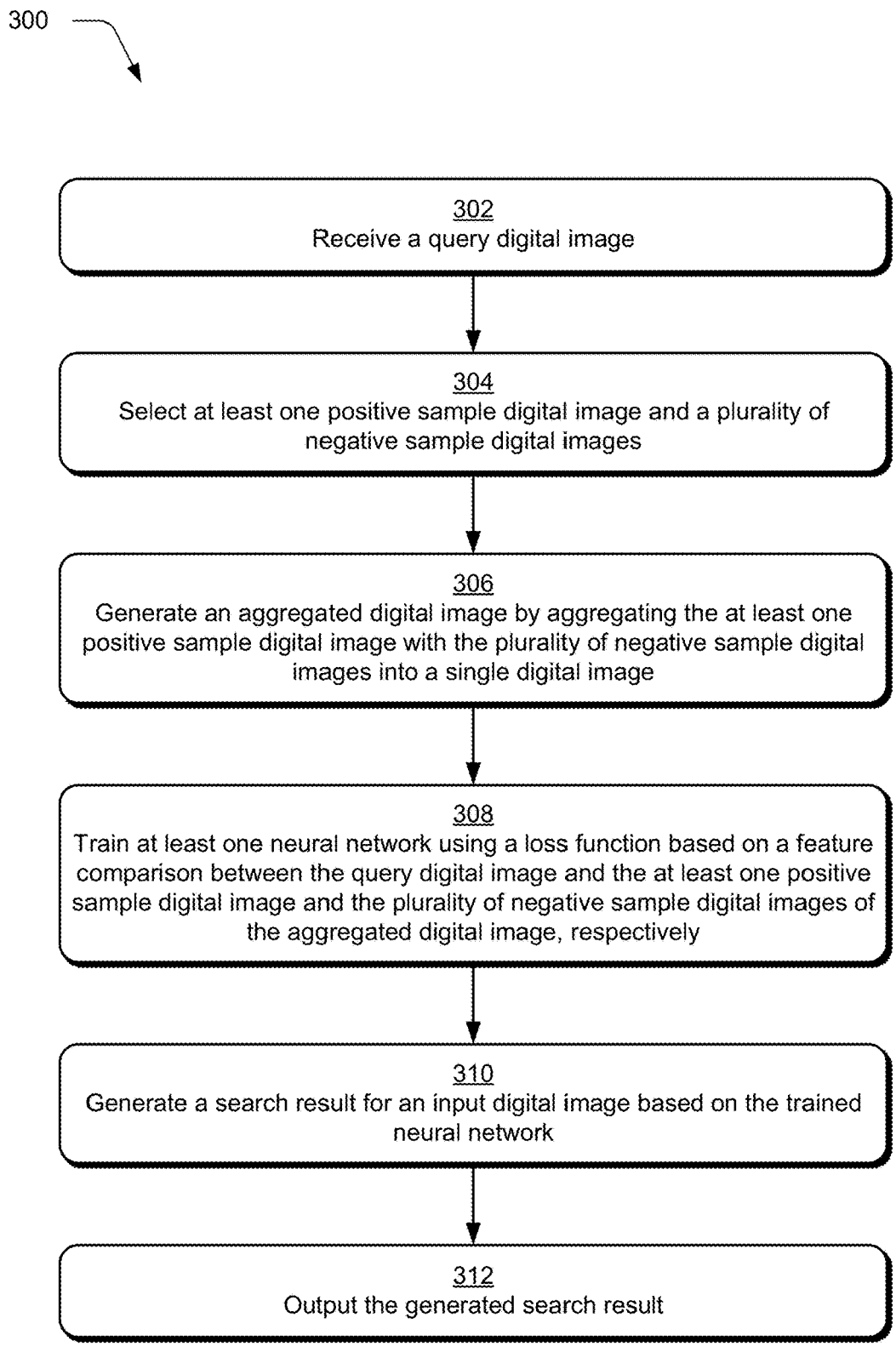
FIG. 3 is a flow diagram depicting a procedure in an example implementation in which at least one neural network is trained using a query digital image and an aggregated digital image to determine image similarity in support of image search.
Figure 4:
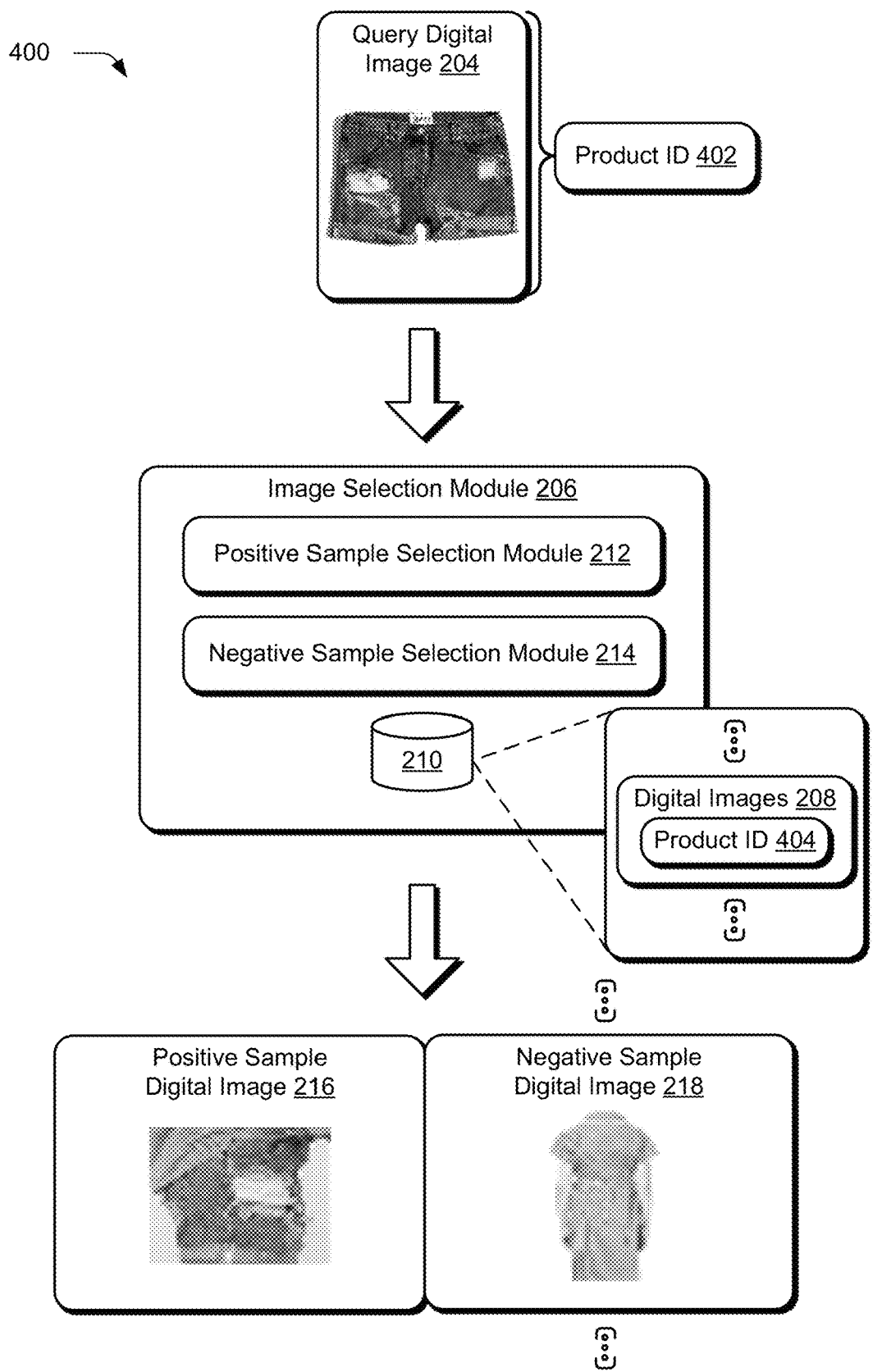
FIG. 4 depicts an example implementation showing operation of an image selection module of FIG. 2 in greater detail to select positive and negative sample digital images.
Figure 5:
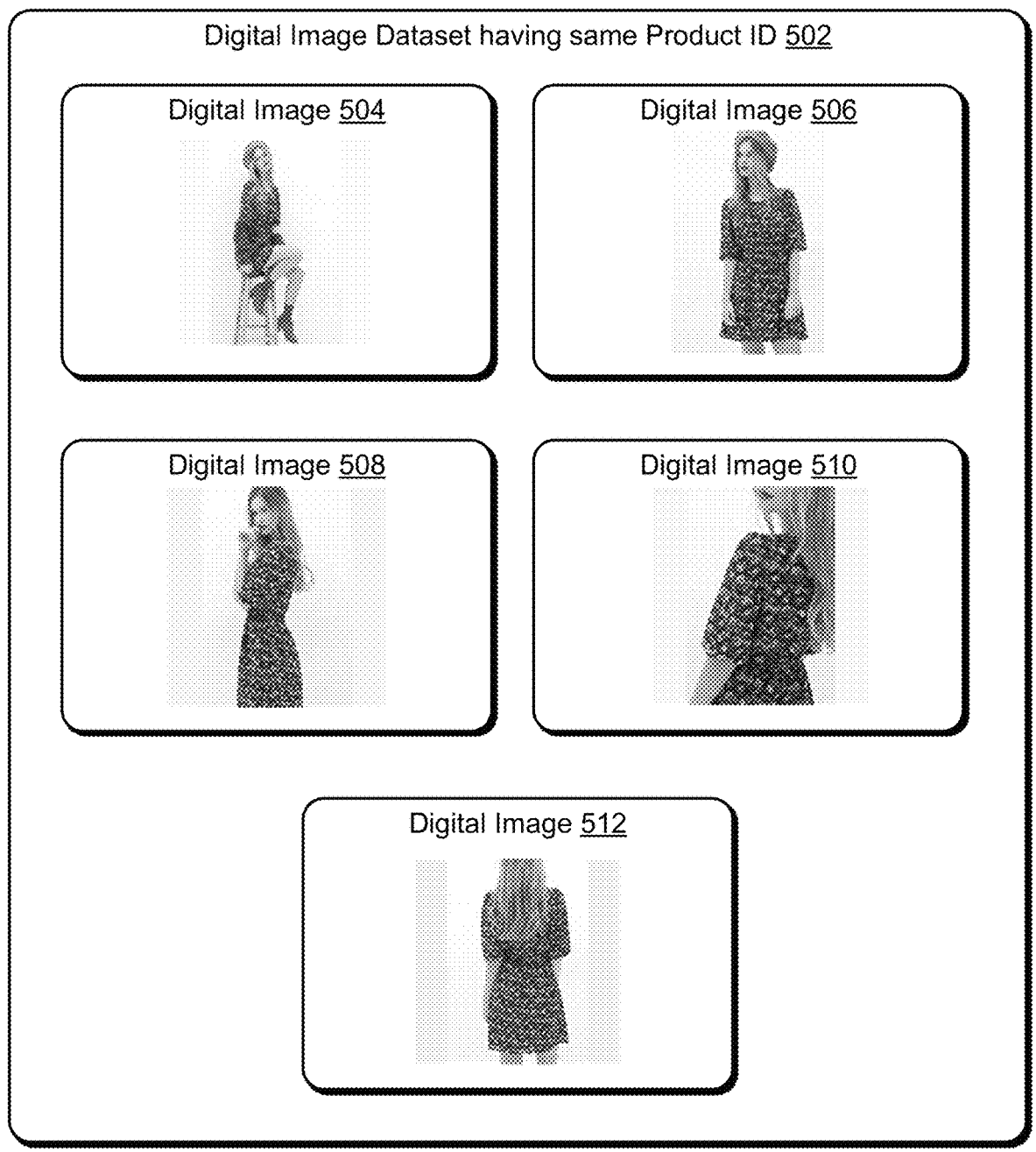
FIG. 5 depicts an example of digital images having a matching product ID that are used to select positive sample digital images.

FIG. 2 depicts a system 200 in an example implementation in which at least one neural network 128 is trained to perform image search based at least in part on an aggregated digital image. FIG. 3 depicts a procedure 300 in an example implementation in which at least one neural network is trained using a query digital image and an aggregated digital image to determine image similarity in support of image search as part of a two-stream machine-learning network architecture.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin this example, a digital image input module 202 of the training data generation module 120 obtains a query digital image 204. The query digital image 204, for instance, may be selected from a plurality of digital images 112 stored in a storage device 114 to be used to train the at least one neural network 128. For example, the query digital image 204 may be obtained for a particular object, for which, the neural network 128 is to be trained to identify as part of a search, an image used as an example of an object to be tagged, and so forth.

The query digital image 204 is then received by an image selection module 206 (block 302) and used to select at least one positive sample digital image and a plurality of negative sample digital images (block 304) from a plurality of digital images 208 maintained in a storage device 210. As show in an example system 400 of FIG. 4, for instance, the query digital image 204 is received by the image selection module 206. The image selection module 206 includes a positive sample selection module 212 and a negative sample selection module 214.

The positive sample selection module 212 is configured to select a positive sample digital image 216 from the plurality of digital images 208 that is visually similar to the query digital image 204. In this example, this similarity is based on a product ID 402 associated with the query digital image 204 that matches a product ID 404 of digital images 208 from a dataset. As shown in an example implementation 500 of FIG. 5, for instance, a digital image dataset having the same product ID 502 is illustrated. Each of the digital images 504, 506, 508, 510, 512 include the same object, but are captured from different views. By leveraging the product ID, the positive sample selection module 212 is ensured to select the positive sample digital image 216 that is visually similar to the query digital image 204 to be used to train the neural network. Other examples are also contemplated to select visually similar images.

The negative sample selection module 214 is configured to select a plurality of negative sample digital images 218 based on the query digital image 204. Continuing with the product ID example, the negative sample selection module 214 may select from a subset of digital images that have a product ID 404 that does not match the product ID 402 of the query digital image 204. The negative sample digital images 218, for instance, may be selected from product IDs for similar types of clothing, but not for the exact same product. Other examples are also contemplated to select visually dissimilar images, such as through use of annotations.

The positive sample digital image 216 and the plurality of negative sample digital images 218 are communicated from the image selection module 206 as an input to the image aggregation module 122. The image aggregation module 122 is then employed to generate an aggregated digital image 124 by aggregating the at least one positive sample digital image 216 with the plurality of negative sample digital images 218 into a single digital image (block 306).

Figure 6:
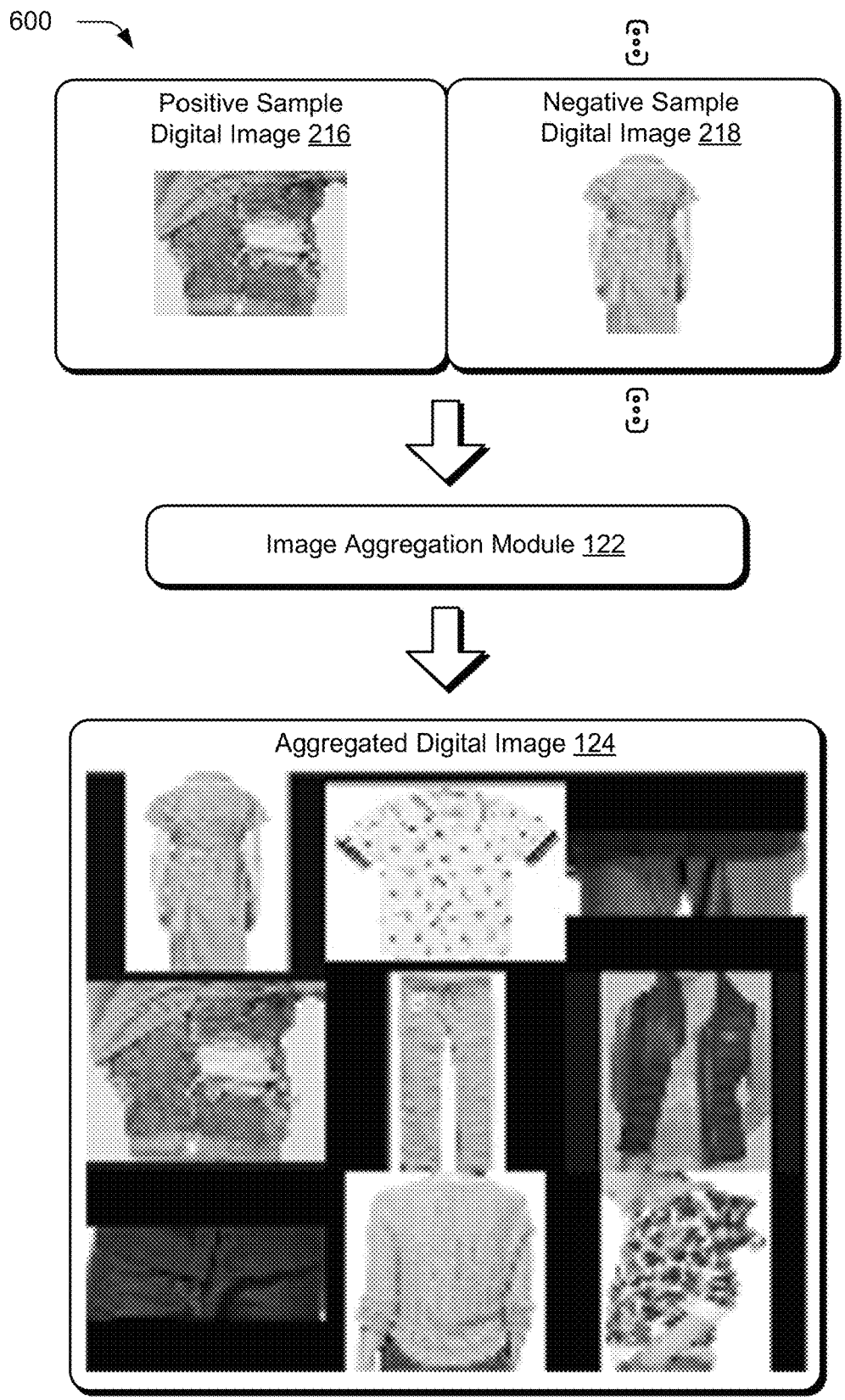
FIG. 6 depicts an example implementation showing operation of an image aggregation module of FIG. 2 to generate an aggregated digital image from the image selected in FIG. 4.

As shown in an example implementation 600 of FIG. 6, an image aggregation module 122 uses the positive sample digital images 216 and the negative sample digital images 218 to form a grid as the aggregated digital image 124. In the illustrated example, the grid is a 3×3 grid that includes a single positive sample digital image 216 and eight negative sample digital images 218. This may be performed, iteratively, to generate a plurality of aggregated digital images 124 that are to be used for training, which are then passed from the training data generation module 120 to the model training module 126.

At least one neural network 128 is then trained by the model training module 126 using a loss function 130 as part of machine learning. The training is based on a feature comparison between the query digital image 204 and the at least one positive sample digital image 216 and the plurality of negative sample digital images 218 of the aggregated digital image 124, respectively (block 308).

Figure 7:
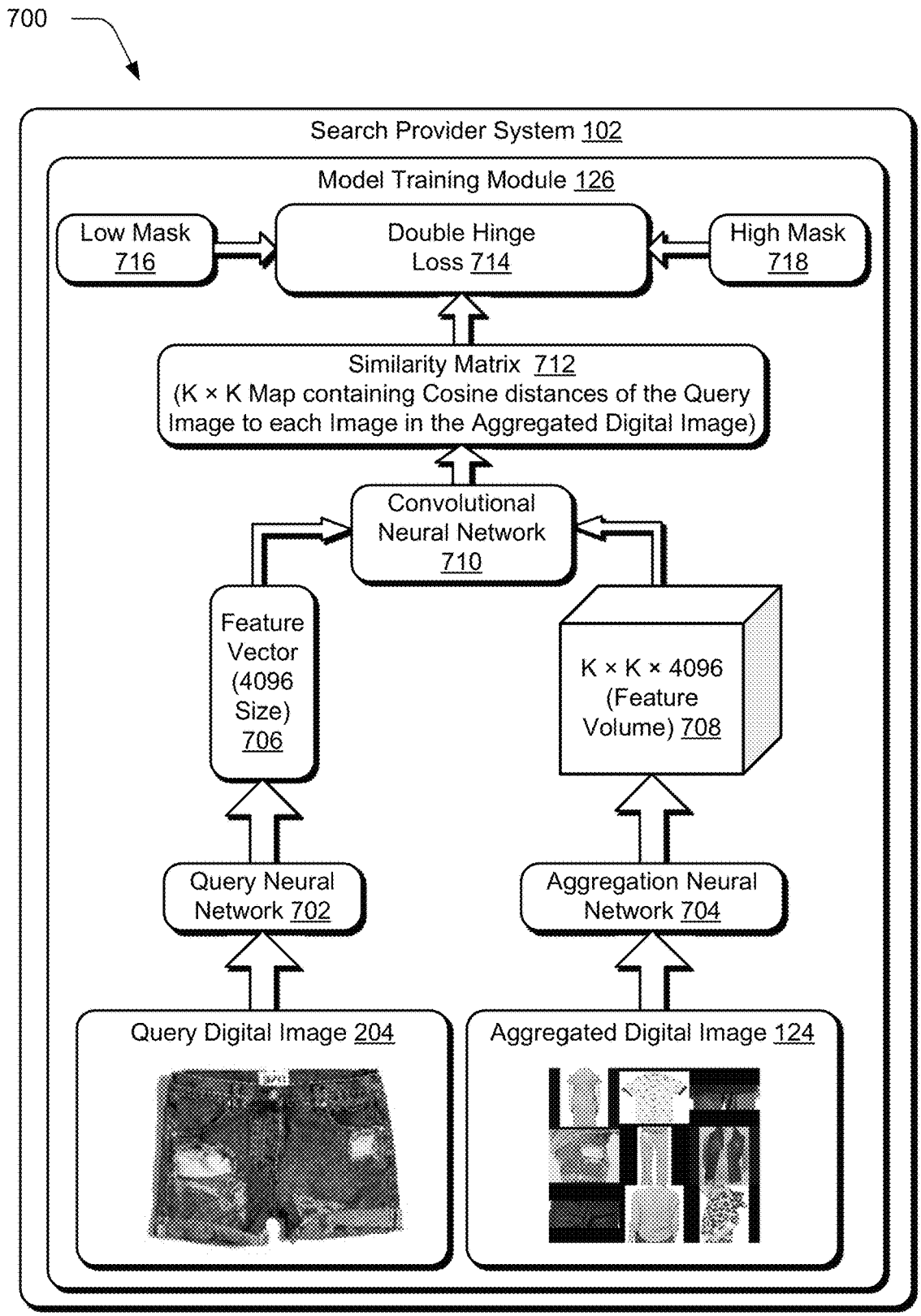
FIG. 7 depicts an example implementation showing operation of a model training module of FIG. 1 to train at least one neural network using a query digital image and aggregated digital image.

FIG. 7 depicts an example network architecture 700 that may be used for training the at least one neural network 128 to perform an image search. The network architecture 700 represents a training pipeline having two branches that include a query neural network 702 and an aggregation neural network 704.

The query neural network 702 is configured to generate a feature vector 706 as a two-dimensional feature vector having a size of 4096 features in the illustrated example corresponding to a cropped version of the query digital image 204. The aggregation neural network 704 is configured to generate a feature volume 708 (e.g., a K×K×4096 feature volume) from the aggregated digital image 124, and more particularity from the samples included in the image. For the grid example of FIG. 6 in which the aggregated digital image 124 includes the one positive sample digital image and the eight negative sample digital images, the feature volume 708 is generated as a 3×3×4096 volume corresponding to the 3×3 grid.

The feature vector 706 of the query digital image 204 is then convolved with the feature volume 708 of the aggregated digital image 124 by a convolutional neural network 710 to form a similarity matrix 712. The similarity matrix 712 is a K×K map containing cosine distances of the query digital image 204 to each image in the aggregated digital image 124.

As a result, the model training module 126 is configured to train the at least one neural network to predict similarity between multiple images (e.g., the query digital image 204 and samples contained in the aggregated digital image 124) in a single pass using a loss function 130. In the illustrated example, the loss function 130 is a double hinge loss 714 based on a low mask 716 and a high mask 718. The model training module 126, for instance, may be configured to predict similarity values in "one go" to keep the similarity value between −1 and 0 if the sample digital image from the aggregated digital image 124 is a negative sample digital image. For positive sample digital images from the aggregated digital image 124, the similarity may be defined using a variety of intervals, e.g., (0.34 to 1), (0.50 to 1), (0.98 to 1), and so on depending on a level of visual similarity desired between the query digital image and the positive sample digital image.

The low and high masks 716, 718 are used to define these intervals using the double hinge loss 712, an example of which is expressed as follows:

$$\text{Loss} = \sum_{j<0}^{j<K} \sum_{i<0}^{i<K} \max(0.0, L[i, j] - M[i, j])^2 + \max(0.0, M[i, j] - H[i, j])^2$$

Here, double summation signifies the addition of losses among each of the sample digital images from the grid of the aggregated digital image 124. For a positive sample digital image, for instance, a low mask and high mask (L,H) pair may be set as (0.50,1.0). If the predicted similarity is 0.65, this lies between the low and high masks 716, 718, and as such zero loss is backpropagated through the network architecture to train the neural networks, e.g., the query neural network 702, the aggregation neural network 704, and the convolutional neural network 710. However, if the predicted similarity is 0.45, this value lies outside this interval between the low and high masks 716, 718 and thus is backpropagated through the network architecture 700 to update weights of nodes of the neural networks as part of the training.

Figure 8:
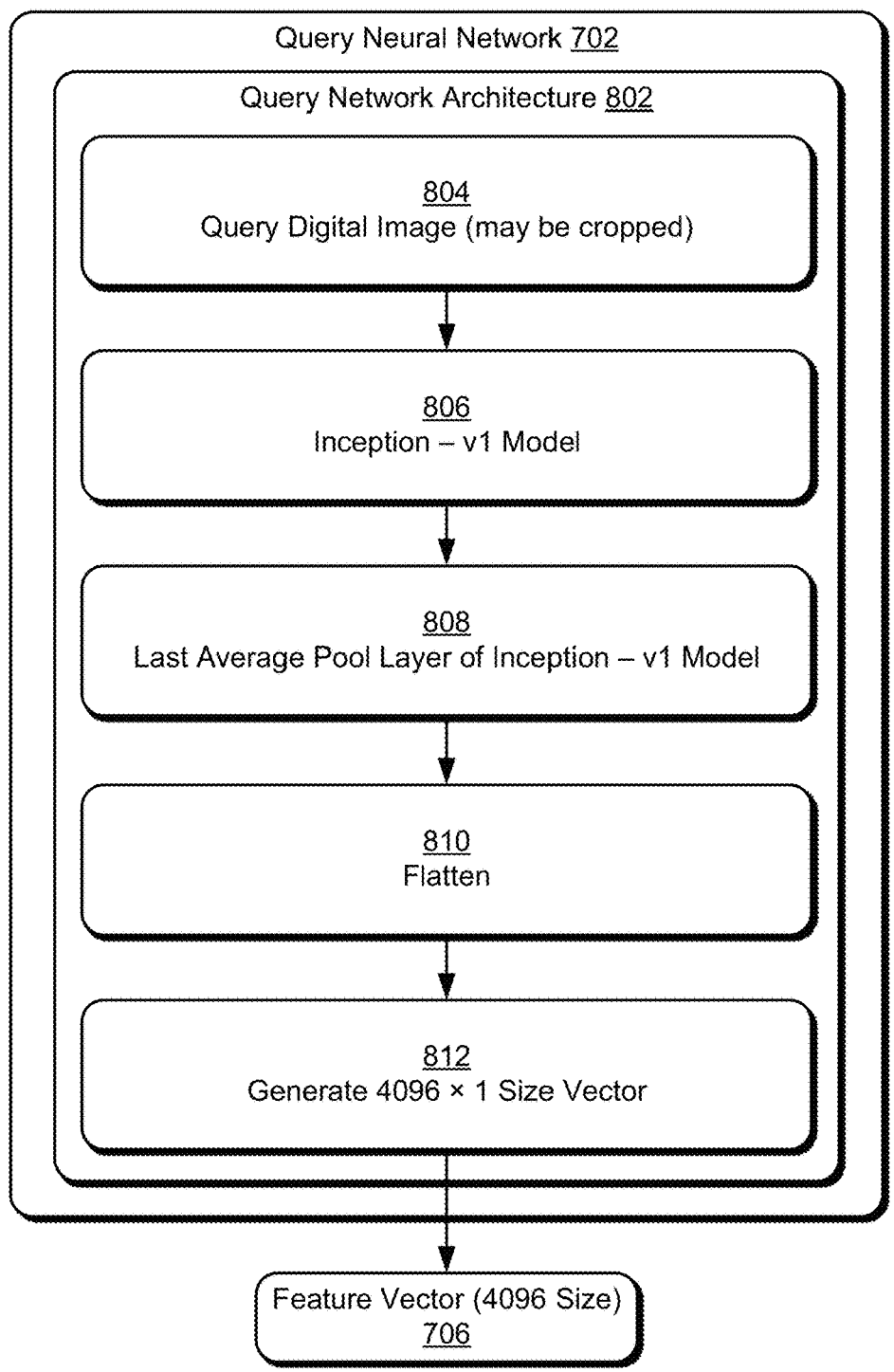
FIG. 8 depicts an example network architecture of a query neural network of FIG. 7.

FIG. 8 is an illustration 800 showing operation of an example of the query neural network 702 of FIG. 7 in greater detail. A query network architecture 802 in this example begins with a query digital image 804 as an input, which may be cropped to capture a particular object within the image. The query digital image 804 is then processed by an Inception-v1 model 806 through an added average pool layer 808 (which takes an average of the nearby four pixels), which is then flattened 810 to generate the 4096×1 size vector 812.

An Inception-v1 model is configured to address large variations in size of salient parts of a digital image, i.e., a size of an object included in a digital image may vary greatly even for the same object. Because of this, selection of a correct kernel size is difficult, because a larger kernel size is used in instances in which information (i.e., the object) is dispersed globally in the digital image and smaller kernels are used in instances in which information is dispersed locally in the digital image. To address this, the Inception-v1 architecture includes multiples filters having different sizes at a same level, an example of which is known as GoogLeNet. A variety of other neural network architectures are also contemplated.

Figure 9:
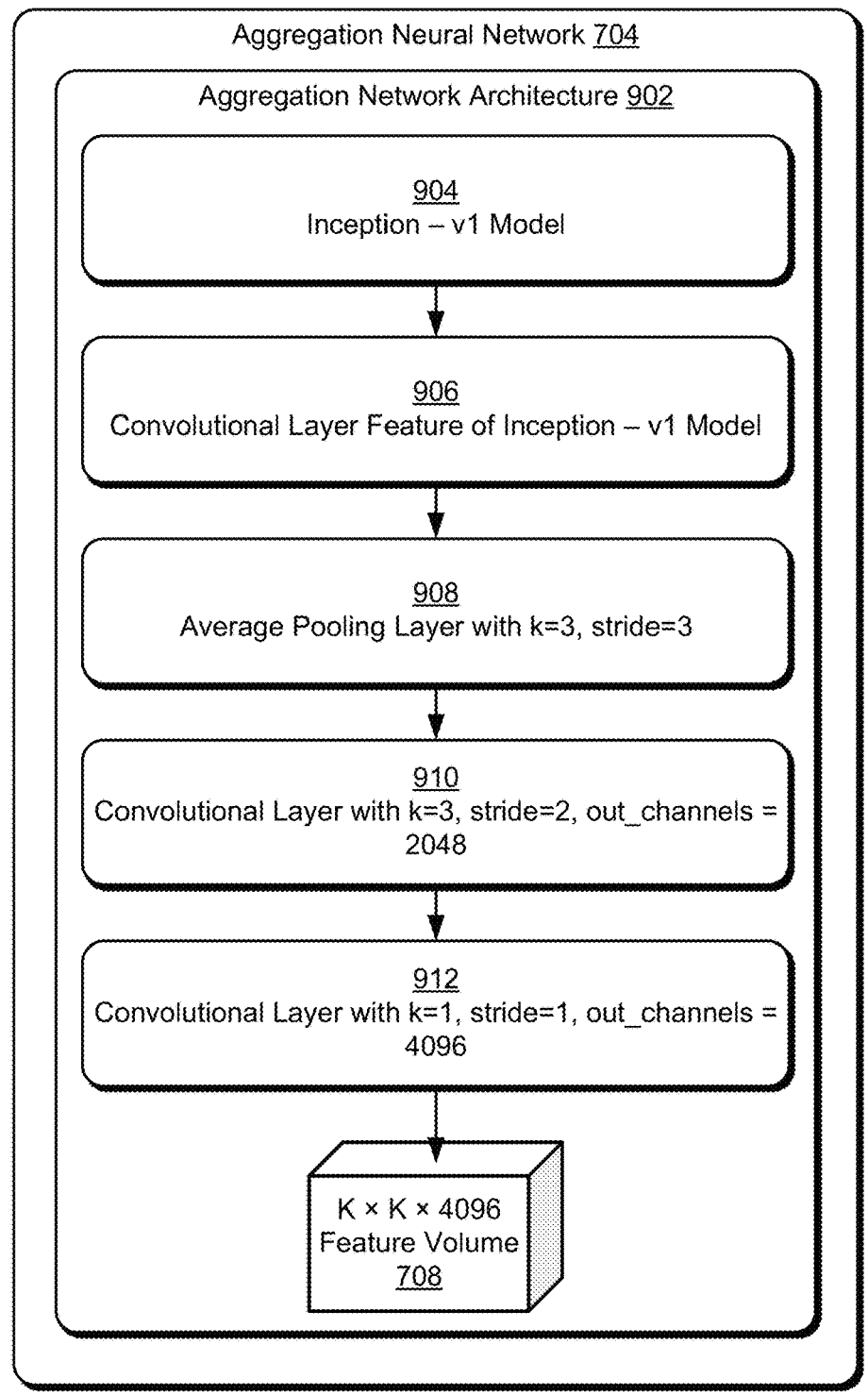
FIG. 9 depicts an example network architecture of an aggregation neural network of FIG. 7.

FIG. 9 is an illustration 900 showing operation of an example of the aggregation neural network 704 of FIG. 7 in greater detail. The aggregation network architecture 902 is also based on an Inception-v1 Model 904 in which a convolutional layer feature of the Inception-v1 model 906 is used along with an average pooling layer with k=3 and stride=3 908. The output of which is processed using a convolutional layer with k=3, stride=2, and out_channels=2048, which is then processed by a convolutional layer with k=1, stride=1, and out_channels=4096 to generate the K×K×4096 feature volume 708. A variety of other neural network architectures are also contemplated.

Figure 10:
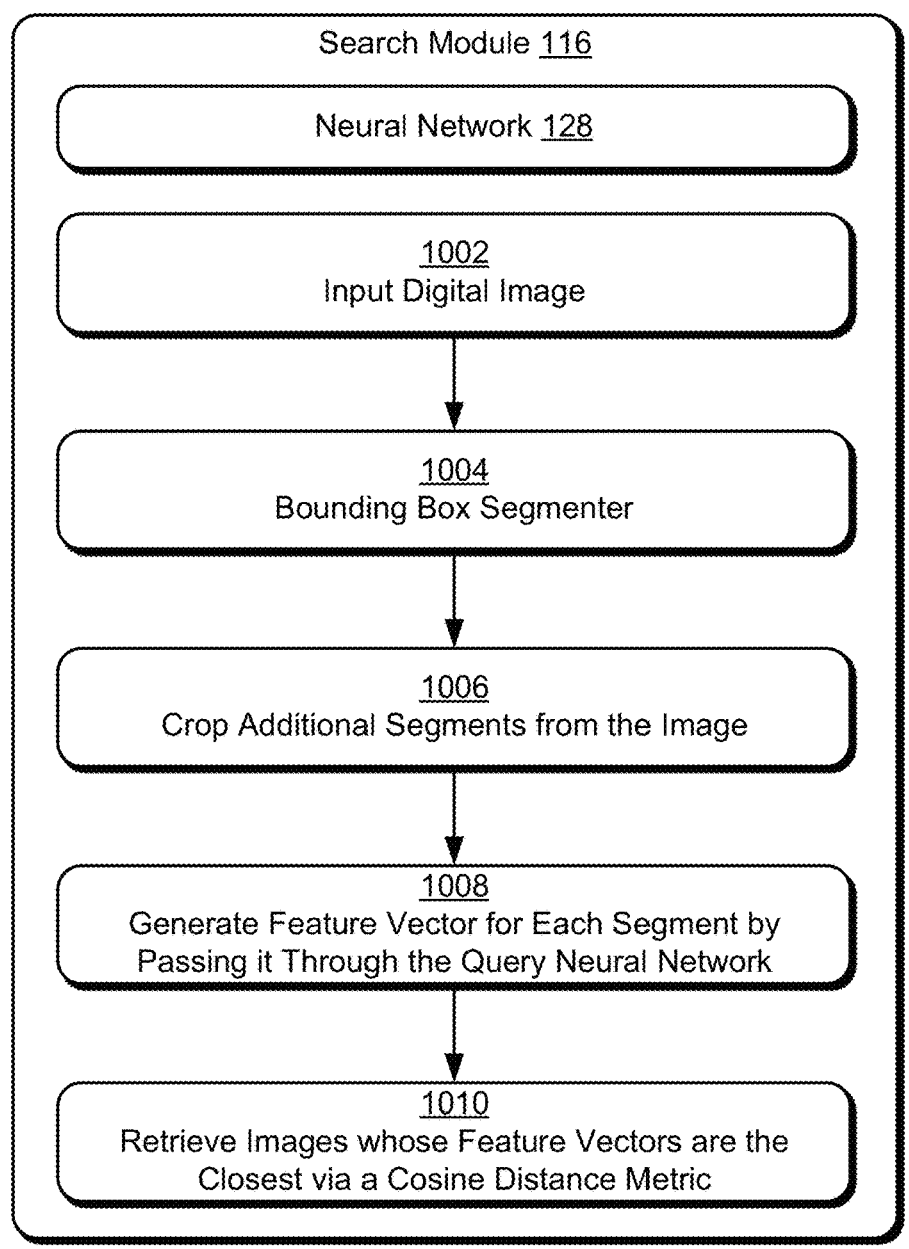
FIG. 10 depicts an example implementation showing operation of a search module of FIG. 1 in greater detail using a trained neural network of FIG. 9.
Figure 11:
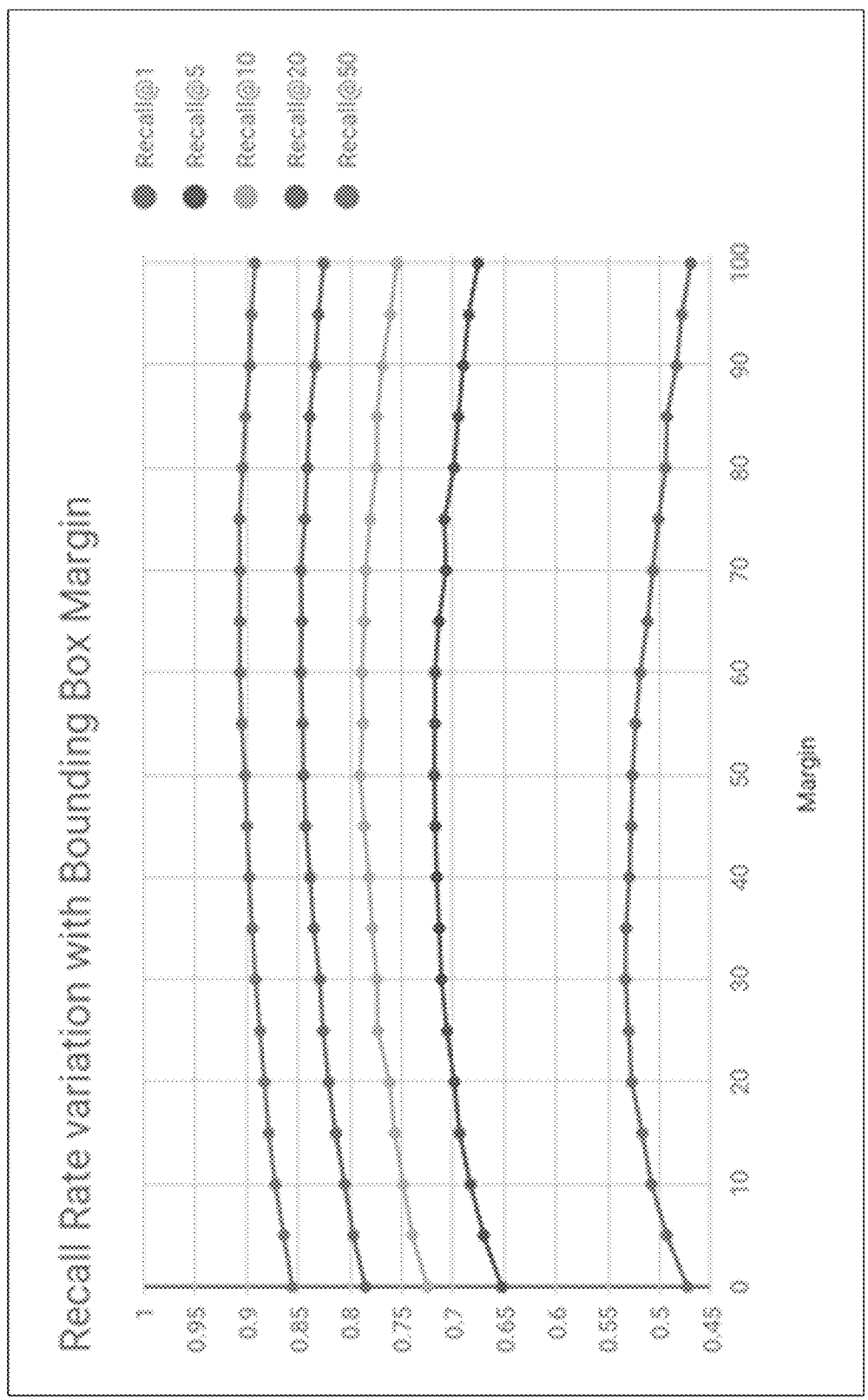
FIG. 11 depicts a graph depicting recall rates for bounding boxes that have been expanded by respective amounts.

FIG. 10 depicts an example implementation 1000 of use of the at least one trained neural network 128 by the search module 116 to generate a search result 118 from an image search (block 310). The neural network 128, as trained, receives an input digital image 1002, i.e., an input digital image after training. The input digital image 1002 is then processed by a bounding box segmenter 1004 to crop a portion of the input digital image that includes an object being searched, e.g., through use of a single shot detector (SSD) based deep neural network to generate bounding boxes corresponding to each object included in the input digital image 1002. In this way, the bounding box segmenter crops additional segments from input digital image, when appropriate 1006.

Each of the bounding boxes (i.e., the cropped segments) are used to generate a feature vector through use of the query neural network 1008, e.g., a two-dimensional 4069-size feature vector as described above. A search result 118 is generated for the input digital image based on the trained neural network 128 (block 310) by retrieving digital images that are closest via a Cosine distance metric 1010. The generated search result 118 may then be output (block 312), e.g., include a plurality of digital images 134 that are visually similar to the input digital image 132 in the search request.

In an implementation, the bounding box segmenter 1104 is configured to first generate a bounding box and then expand a size of the bounding box (e.g., along one or more dimensions) which is then used as a basis for the search. It has been observed that increasing a size of the bounding boxes (e.g., by a set number of pixels described as a margin value) increases accuracy in an image search result, which is referred to as a recall rate in an example graph 1100 of FIG. 11. This is achieved because the bounding box captures additional contextual information in a neighborhood of the object contained in the digital image, which performs better than a tightly cropped bounding box with zero margin.

Thus, to train a neural network of the service provider system 102 that is to perform the search, the service provider system utilizes a query digital image 204 and an aggregated digital image 124. The aggregated digital image 124 is formed based on the query digital image 204 to include at least one positive sample digital image 216 and a plurality of negative sample digital images 214 to form a single image. A service provider system 104, for instance, may receive the query digital image 204 that is associated with a particular product ID. The service provider system 102 then selects the positive sample digital image 216 that also is associated with the product ID and the plurality of negative sample digital images 218 that are associated with different product IDs (but which may be for the same type of product, but not that particular product).

These samples are then aggregated together by the service provider system 102 to form the aggregated digital image 124 as a single image that includes each of these samples. In this way, the neural network of the service provider system 104 views multiple negative instances using the aggregated digital image 124 in a single pass as part of training, as opposed to the multitude of passes required by a single negative sample per image mismatch comparison as performed in conventional Siamese-type machine learning architectures. This leads to faster convergence and accuracy in the training of the neural networks over conventional approaches, thereby improving computational efficiency. Additionally, this is performed without creating separate copies of a neural network for each of the negative instances as required in conventional techniques as described above. Rather, the techniques described herein employ a single copy of the neural network for the negative samples, which decreases an amount of memory overhead and thus further increases computational efficiency of computing devices that implement these techniques.

These techniques are also configured to determine image attributes independently in an unsupervised manner through machine learning without requiring manually supervised attribute training of conventional techniques. This reduces an amount of user involvement otherwise required by conventional techniques to manually select such attributes, and thus also reduces error introduced by user selection of these attributes as described above.

A machine-learning architecture, for instance, may be employed by the service provider system 102 to process the query digital image 204 to form a feature vector using a query neural network and the aggregated digital image using an aggregation neural network to form a three-dimensional feature volume. The feature vector, for instance, may be expressed as 4096 dimensional feature vector. The feature volume is expressed as a 3×3×4096 volume for an example in which the aggregated digital image include one positive sample digital image and eight negative sample digital images, thereby forming a 3×3 grid.

A convolutional neural network is then employed by the machine-learning architecture of the service provider system to convolve the feature vector with the feature volume. In this example, the convolution generates a 3×3 similarity matrix between the query digital image and respective sample digital images included in the aggregated digital image. In this way, the service provider system 104 is configured to train the neural network to predict similarity values between multiple digital images in a single pass, i.e., "in one go."

A loss function 130 is employed as part of the machine-learning architecture of the service provider system to train the neural network. Low masks and high masks of a double-hinge loss function, for instance, may be used to specify thresholds within which cosine distances are to lie, i.e., the upper and lower bounds for the similarity values described above. As part of this training, for instance, the service provider system 102 may employ low and high masks to keep a similarity value between −1 to 0 for negative sample digital images and between (0.34,1), (0.50,1), or even (0.98, 1) for positive sample digital images. The loss function 140 is then used to update weights of the neural network, e.g., for losses that appear "outside" of the upper or lower bounds. In the example above, the loss function is also referred to as a double-hinge loss function. In this way, the aggregated digital images, network architecture, and feature extraction may be used to increase efficiency and accuracy in training neural networks to perform an image search as opposed to conventional techniques.

The service provider system 102 may then employ the trained neural network to support a variety of functionality that is not possible using conventional techniques, such as to receive an input digital image and generate a search result based on similarity of the input digital image to respective digital images in a database that exhibit high degrees of variance. This may be used to search for and locate digital images of product imagery, e.g., shown as spin sets or other product views, in various example settings, including a banner or video frame. Further, the search functionality described herein may be integrated or used with fine-grained tagging capabilities by the service provider system to assign tags to digital images automatically and without user intervention. For such uses, these techniques may be trained to tag images with domain specific or customer specific tags. For example, the service provider system 102 may employ the trained neural networks to tag images of cars with specific model names and even different objects included in the digital image, e.g., to find the image of a handbag which is being held by a model in a photograph that contains a large amount of distracting background. In this way, the techniques described herein overcome the limitations of conventional approaches as described above.

Example System and Device

Figure 12:
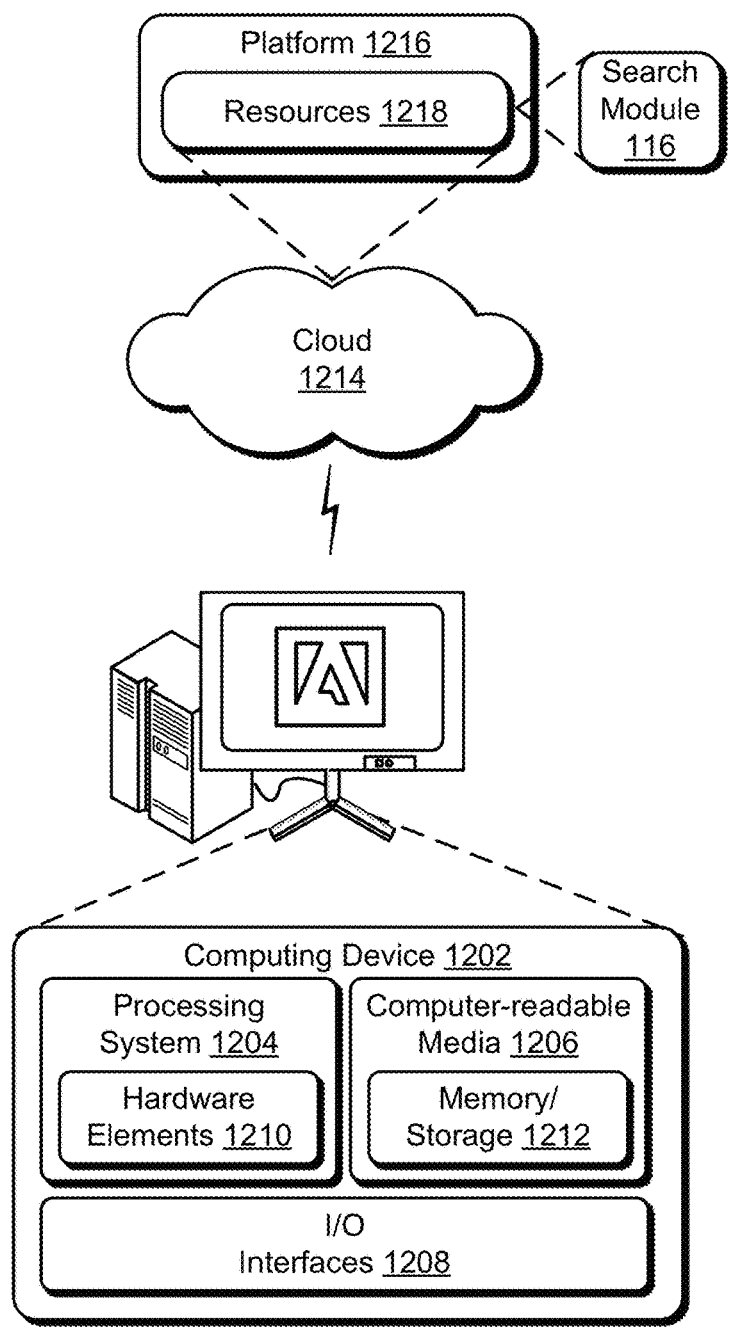
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the search module 112. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium image search environment, a method implemented by at least one computing device, the method comprising:
   receiving, by the at least one computing device, a query digital image;
   selecting, by the at least one computing device based on the query digital image, at least one positive sample digital image and a plurality of negative sample digital images;
   generating, by the at least one computing device, an aggregated digital image by aggregating the at least one positive sample digital image with the plurality of negative sample digital images into a single digital image; and
   training, by the at least one computing device, at least one neural network using a loss function as part of machine learning based on a feature comparison between the query digital image and:
   the at least one positive sample digital image; and
   the plurality of negative sample digital images of the aggregated digital image, respectively.

2. The method as described in claim 1, wherein the training of the at least one neural network based on the feature comparison between the query digital image and the at least one positive sample digital image and the plurality of negative sample digital images of the aggregated digital image, respectively, is performed in a single pass.

3. The method as described in claim 1, wherein the training of the at least one neural network includes generating a feature vector based on the query digital image and generating a three-dimensional feature volume from the at least one positive sample digital image and the plurality of negative sample digital images in the aggregated digital image.

4. The method as described in claim 3, wherein the training includes generating a feature map by convolving the feature vector and the three-dimensional feature volume, the feature map containing cosine distances from the feature vector of the query digital image to:
   a feature vector of the at least one positive sample digital image from the three-dimensional feature volume; and
   respective feature vectors of the plurality of negative sample digital images from the three-dimensional feature volume.

5. The method as described in claim 4, wherein the loss function includes a low mask and a high mask that specify respective thresholds within which the cosine distances are used to determine loss values between the cosine distances and the low mask or high mask, respectively.

6. The method as described in claim 1, further comprising generating a bounding box corresponding to at least a portion of an object depicted in the input digital image and wherein the generating of the search result is based on the bounding box.

7. The method as described in claim 6, wherein the generating of the bounding box includes passing the query digital image through a single shot detector (SSD) based deep neural network.

8. The method as described in claim 6, further comprising expanding a context of the bounding box around the portion of the object by expanding a margin of the generated bounding box as including an additional portion of the query digital image.

9. The method as described in claim 1, wherein the generating of the search result includes generating a feature vector for the input digital image, comparing the feature vector to feature vectors generated for respective digital images of a plurality of digital images, and the search result is based on the comparing.

10. The method as described in claim 1, wherein the selecting of the at least one positive sample digital image and the plurality of negative sample digital images based on the query digital image is based on respective product identifiers.

11. The method as described in claim 1, wherein the loss function is a double margin loss.

12. In a digital medium image search training environment, a system comprising:
a positive sample selection module implemented at least partially in hardware of a computing device to select at least one positive sample digital image from a plurality of digital images based on a query digital image;
a negative sample selection module implemented at least partially in hardware of the computing device to select a plurality of negative sample digital images from the plurality of digital images based on the query digital image;
an aggregation module implemented at least partially in hardware of the computing device to generate a single aggregated digital image by aggregating the at least one positive sample digital image with the plurality of negative sample digital images; and
a training module implemented at least partially in hardware of the computing device to train a neural network using a loss function as part of machine learning to generate a search result from a search of the plurality of digital images, the neural network trained through use of the positive sample digital image and the plurality of negative sample digital images within the single aggregated digital image in a single pass.

13. The system as described in claim 12, further comprising a search module implemented at least partially in hardware of the computing device to generate the search result in response to a search request that includes an input digital image based on the trained neural network.

14. The system as described in claim 12, wherein the positive sample selection module is configured to select at least one positive sample digital image based on a product identifier that corresponds to a product identifier of the query digital image.

15. The system as described in claim 12, wherein the negative sample selection module is configured to select the plurality of negative sample digital images as having a product identifier that does not correspond to a product identifier of the query digital image.

16. The system as described in claim 12, wherein the training module is configured to generate a feature vector based on the query digital image and generate a three-dimensional feature volume from the at least one positive sample digital image and the plurality of negative sample digital images in the aggregated digital image.

17. The system as described in claim 16, wherein the training module is configured to generate a feature map by convolving the feature vector and the three-dimensional feature volume, the feature map containing cosine distances from the query digital image to the at least one positive sample digital image and the plurality of negative sample digital images in the aggregated digital image, respectively.

18. In a digital medium image search training environment, a system comprising:
means for receiving a search request that includes an input digital image; and
means for generating a search result from a plurality of digital images by at least one neural network based on the input digital image of the search request, the at least one neural network trained based on a feature comparison between a query digital image and an aggregated digital image that includes at least one positive sample digital image along with the plurality of negative sample digital images arranged in a grid that are selected based on the query digital image.

19. The system as described in claim 18, wherein the at least one neural network is trained based on a feature comparison between the query digital image and the at least one positive sample digital image and the plurality of negative sample digital images of the aggregated digital image.

20. The system as described in claim 19, wherein the training is performed for the at least one positive sample digital image and the plurality of negative sample digital images in a single pass using the aggregated digital image.

* * * * *